Feb. 26, 1935.     C. T. FLETCHER     1,992,656
ELECTRICAL CONDUCTOR
Filed Aug. 16, 1932
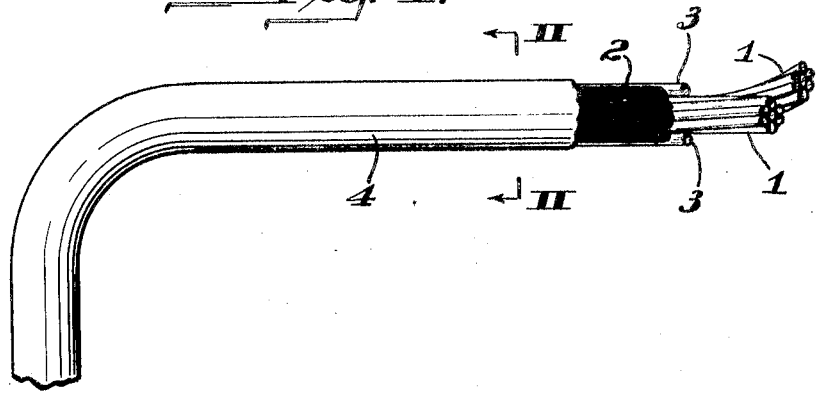
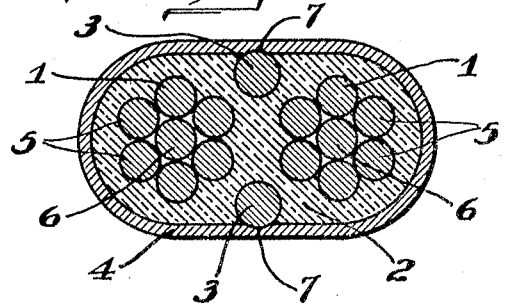
Inventor:
Clarence T. Fletcher, dec'd
by Ruth A. Fletcher, Executrix
BY
ATTORNEY Patented Feb. 26, 1935

1,992,656

UNITED STATES PATENT OFFICE 1,992,656

ELECTRICAL CONDUCTOR

Clarence T. Fletcher, deceased, late of New Kensington, Pa., by Ruth A. Fletcher, executrix, New Kensington, Pa., assignor to Aluminum Company of America, a corporation of Pennsylvania Application August 16, 1932, Serial No. 628,998

3 Claims. (Cl. 173—266)

The invention relates to electrical conductors and in particular to metal sheathed conductors adapted for use in the wiring of buildings or other structures generally for low voltage installations. It has particular application to electrical communication systems such as telephonic and signal installations.

Among the methods commonly employed today for the installation of electrical conductors in houses and buildings or other structures may be mentioned the threading of the conductor through rigid metal conduit with the customary fittings and outlet boxes which is known as a metal conduit installation; and the so-called open wire installation in which the conductor is mounted in or on insulator tubes or knobs at the points of attachment and where the conductor passes through joists, purlins, or other obstructions. The enclosed wire installation or conduit installation is generally considered preferable from a number of standpoints, such as safety from fire as might be occasioned by short circuits. The metal conduit is grounded and quite effectually eliminates the fire hazard. On the other hand, the conduit installation is very expensive, both from the standpoint of labor and materials involved, and is not always adapted to space requirements. Another form of conduit installation is found in the type which is known as flexible conduit installation. This is a spirally wound metallic conduit which can be bent around corners and is therefore cheaper to install than the rigid metal conduit in which a larger number of fittings are required. Both the flexible and the rigid type of metal conduit are open to the objection that they are somewhat difficult to install because of the necessity of threading the conductors through the conduit "on location". This also means that the conduit and the conductor wire must be separately purchased and separately handled. It will be understood that in all of the installation methods hereinabove referred to, the conductor wire is itself provided with a suitable insulation.

It is an object of the invention to eliminate the necessity for a separate conduit by providing a metallic sheath which forms an integral part of the conductor cable and which requires no separate handling of the conduit and insulated conductor. It has heretofore been proposed to provide conductor cables with metallic sheaths, as exemplified by the armored cable used in submarine and subsoil installations and elsewhere. The present invention is directed more particularly to electrical conductors for use above ground and specifically to conductors for use in buildings. A further and more specific object of the invention is the provision of an insulated aluminum conductor provided with a closely fitting seamless aluminum sheath which is adapted for use in communication wiring. This type of sheathed conductor is peculiarly adapted to the signal wiring of lighter-than-air craft of the type commonly referred to as Zeppelin rigid airships, or to semi-rigid ships.

Other objects and advantages will appear in connection with the following description of preferred embodiments of the invention. In the drawing, Fig. 1 is a fragmentary view of a length of conductor embodying the invention in which the metallic sheath and insulating material have been broken away to clearly illustrate the construction and Fig. 2 is a transverse sectional view to an enlarged scale taken on the lines II—II of Fig. 1.

In the form of conductor chosen for the purpose of illustration in Figs. 1 and 2, there are two multiple strand conducting elements 1, 1 surrounded by rubber insulation or other insulating medium 2. Between the conducting elements 1 there are disposed filler wires 3, 3 (seen best in Fig. 2) which are embedded in the insulating material 2. A seamless aluminum sheath 4, the inside dimensions of which are initially slightly greater than the outside dimensions of the insulated conductor, is brought down tightly against the insulating material 2 and filler wires 3. This operation is conveniently performed by threading the insulated conductor through the seamless aluminum tube and thereafter drawing the composite sheathed conductor through a suitable die or series of dies. The method and apparatus for performing this operation are well known to those skilled in the art, and since the method and apparatus per se form no part of the present invention it is unnecessary to include a detailed description of the method of forming the seamless aluminum sheath around the insulated conductor.

As will be seen in Fig. 2, the conductor elements 1 may be made up of a plurality of individual strands 5 as may be desired. These strands 5 consist of aluminum although one or more of them may be steel in the event that high tensile strength is required. Thus the center strand 6 may be of steel so that each conductor element 1 consists of aluminum cable steel reinforced. It will therefore be understood that throughout the specification and claims, wherever the term "aluminum conductor" or " aluminum conductor element" is employed, it is the intention to include not only all-aluminum conductors but aluminum cable steel reinforced as well. It will also be understood that the multiple strand conductors may if desired be replaced by single strand conductors without sacrificing the advantages incident to the invention.

The filler wires 3 may be made of either aluminum or steel although the former is preferred. While these filler wires 3 may contribute to the tensile strength of the conductor, their principal function lies in the direction of simplifying the manufacture of the composite sheathed cable. When the conductor elements 1 are fabricated and covered with the insulating material and are then placed side by side, there will be a small amount of space left at the points occupied by the fillers 3, 3 and these wires form a convenient method of filling up this open space. When the sheathed conductor is drawn through the final forming die, it may force the filler wires 3 into the wall of the sheath 4 so as to indent it slightly as at 7. This is not an objectionable feature and may be of advantage in forming a compact unitary structure.

It will be readily understood that the filler wires 3 may be dispensed with or that when used may be made of other materials than have been suggested. For example, an asbestos rope or a rubber cord might be substituted for the metallic wire illustrated and described in connection with the preferred embodiment of Figs. 1 and 2. It is also manifest that any desired number of conductors may be employed and that wherever a seamless aluminum sheath is caused to tightly enclose an insulated aluminum conductor in a compact unitary structure embodying a metallic conduit member, the advantages of the invention will be realized.

It will be seen that by the invention of an insulated aluminum conductor tightly enclosed in a seamless aluminum sheath there is provided a composite conductor and conduit which is characterized by its lightness, compactness, and which can be easily handled and installed. It can be bent around comparatively sharp corners (see Fig. 1), has a smooth outer surface (in contrast to flexible conduits heretofore known or used). It will further be understood that with the improved unitary conductor and conduit the sheath which forms the conduit contributes to the strength of the insulated conductor itself and there is no opportunity for abrasion between the two and therefore a minimized danger from short circuits occasioned by friction between the conductor and conduit. The seamless aluminum sheath hermetically seals the conductor so there is no opportunity for moisture to penetrate the insulated material and lower its efficiency. This latter is a very decided advantage over the "basket weave" sheathing which has been proposed heretofore.

It will be quite apparent that the invention may assume a variety of embodiments without departing from the concept defined in the accompanying claims.

What is claimed is:

1. A composite conductor cable and conduit comprising a plurality of conductor elements embedded in an insulating material, each of said conductor elements consisting of a steel core surrounded by conductor wires, filler wires disposed near the surface of said insulating material, and a seamless aluminum conduit drawn tightly over said insulating material and said filler wires so as to frictionally engage the insulation and form a compact unitary structure in which the insulating material completely fills all of the voids between adjacent conductor wires and between the conductor wires, filler wires and said seamless aluminum conduit.

2. A composite conductor cable and conduit comprising a plurality of conductor elements embedded in an insulating material, each of said conductor elements consisting of a steel core surrounded by conductor wires, steel filler wires disposed near the surface of said insulating material, and a seamless aluminum conduit drawn tightly over said insulating material and said filler wires so as to frictionally engage the insulation and form a compact unitary structure in which the insulating material completely fills all of the voids between adjacent conductor wires and between the conductor wires, filler wires and said seamless aluminum conduit.

3. A composite conductor cable and conduit comprising a plurality of conductor elements embedded in an insulating material, each of said conductor elements consisting of a steel core surrounded by conductor wires, filler wires disposed at the surface of said insulating material, and a seamless aluminum conduit drawn tightly over said insulating material and said filler wires so as to frictionally engage the insulation and the filler wires and form a compact unitary structure in which the insulating material completely fills all of the voids between adjacent conductor wires and between the conductor wires, filler wires and said seamless aluminum conduit, said filler wires being partially embedded in the aluminum conduit.

RUTH A. FLETCHER,
*Executrix of the Estate of Clarence T. Fletcher, Deceased.*